United States Patent [19]

Pierce

[11] Patent Number: 4,759,150
[45] Date of Patent: Jul. 26, 1988

[54] ADHESIVE FLY CATCHER WITH COVER AND INSECTICIDE

[76] Inventor: Robert Pierce, P.O. Box #307, Pittsburgh, N.H. 03592

[21] Appl. No.: 19,634

[22] Filed: Feb. 27, 1987

[51] Int. Cl.[4] .............................................. A01M 3/04
[52] U.S. Cl. ........................................ 43/136; 43/137
[58] Field of Search .......................... 43/136, 114, 137

[56] References Cited

U.S. PATENT DOCUMENTS

| 1,604,460 | 10/1926 | Marlow | 43/136 |
| 2,328,632 | 9/1943 | Etzler | 43/136 |
| 2,618,882 | 11/1952 | Martin | 43/136 |
| 3,449,856 | 6/1969 | Weaver | 43/136 |
| 4,653,222 | 3/1987 | Viscosi | 43/137 |

FOREIGN PATENT DOCUMENTS

| 63511 | 6/1949 | Netherlands | 43/136 |
| 449721 | 7/1936 | United Kingdom | 43/136 |

Primary Examiner—Gene P. Crosby
Attorney, Agent, or Firm—John M. Brandt

[57] ABSTRACT

A fly or insect catcher having the appearance of a common fly swatter with a handle and head, which catcher has a sheet of adhesive material disposed on the head and a hingeably attached cover arranged to cover the head when not in use. A quantity of insecticide may be disposed in the cover to aid in killing the insects caught on the adhesive when the cover is closed.

6 Claims, 1 Drawing Sheet

ADHESIVE FLY CATCHER WITH COVER AND INSECTICIDE

BACKGROUND OF THE INVENTION

1. Field of the Invention

The invention resides in the field of fly or insect catchers and more particularly relates to those implements having a sticky or adhesive surface to which the insect adheres.

2. Description of the Prior Art

A number of devices having a handle and head piece to which is attached a sheet or coating of adhesive or sticky material appear in the prior art. The purpose of these arrangements is to capture an insect, most often a fly, rather than to crush it as is the case with the common fly swatter. The advantages are, among others, that no damage is likely to occur to objects which would otherwise be struck by the striking type of swatter and that the insect is gathered up in its entirety rather than falling away or being squashed on a surface.

Examples of catcher designs with various forms of adhesive surfaces include U.S. Pat. Nos. 1,802,774, Nixon, disclosing a plurality of superimposed sheets of adhesive coated paper; U.S. Pat. No. 2,437,447, Tarbell, showing an adhesive coated cup; U.S. Pat. No. 2,618,882, Martin, illustrating an adhesively coated perforated replaceable member; and U.S. Pat. No. 3,449,856, Weaver, describing a transparent adhesively covered replaceable head.

All of these inventions are used and operate in the same manner, that is, the insect comes in contact with the adhesive and is retained thereby.

The disadvantage of this method is that after use, one or more insects remain alive on the catcher and may eventually break free or in the case of flies, may buzz for a period of time. To avoid this problem, the adhesive member in prior art devices must be thrown away after each use. Storage may also present some difficulty as the exposed sticky surface must be placed so as to avoid other objects.

To extend the use of the adhesive surface and overcome the above difficulties, the invention described herein improves upon the basic prior art devices by providing first an attached hinged cover to protect the adhesive when not in use and second a quantity of insecticide disposed in the cover to hasten the demise of insects trapped on the surface.

SUMMARY OF THE INVENTION

The invention may be summarized as an improved fly or insect catcher having a head member on which is disposed a sheet of adhesive material, a cover for shielding and enclosing the material when the catcher is not in use, and a quantity of insecticide placed within the cover to kill the insects. The head is attached to a handle for manipulation and the cover is attached to either by a hinge. One or more catcher may be provided to hold the cover in the open or closed position and a rim separating the adhesive surface of the head and the cover is positioned between the two.

A specific construction of the invention comprises a unitary molded plastic combination of handle, head, hinge, and cover.

The advantages and features of the invention will be more fully understood from the drawings and description of the preferred embodiment which follow.

DESCRIPTION OF THE PREFERRED EMBODIMENT

Figure 1:
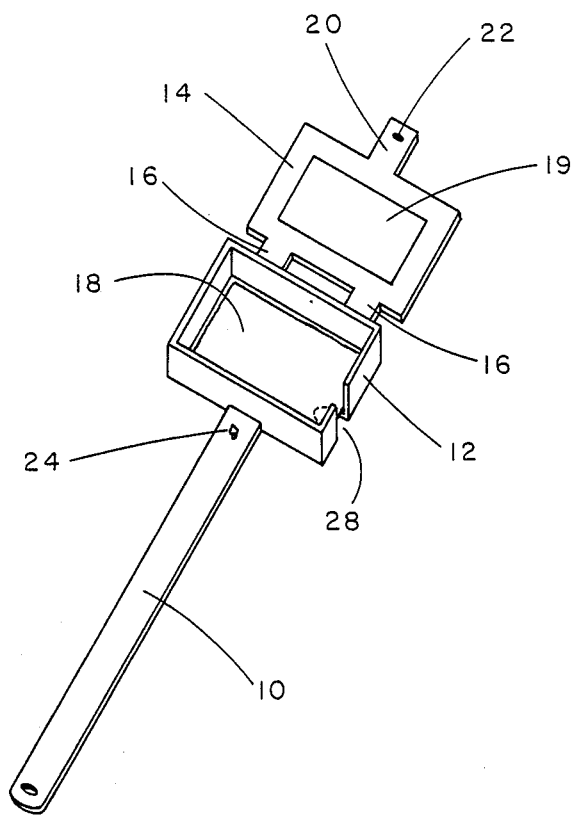
FIG. 1 is a perspective view of the preferred embodiment.

Referring first to the FIG. 1, there is illustrated a perspective view of the preferred embodiment of the invention comprised of handle 10, head member 12 attached thereto, and cover 14 attached to head 12 by hinges 16. A sheet of adhesive material 18 is disposed within head 12 and a quantity of insecticide, for example, a solid retained in a porous matrix 19, is disposed in cover 14.

Figure 3:
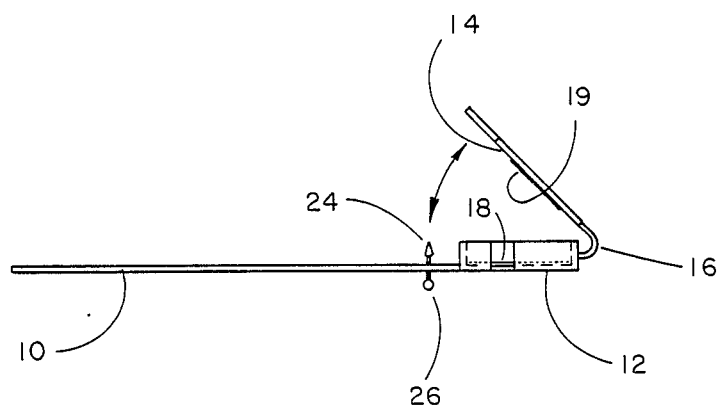
FIG. 3 is a side view of the embodiment of FIG. 1.

A portion 20 of cover 18 having hole 22 extends outwardly to communicate with catch 24 to hold the cover closed as indicated in FIG. 3. An additional catch 26 allows the cover to be retained in an open position folded back behind head 12.

Figure 2:
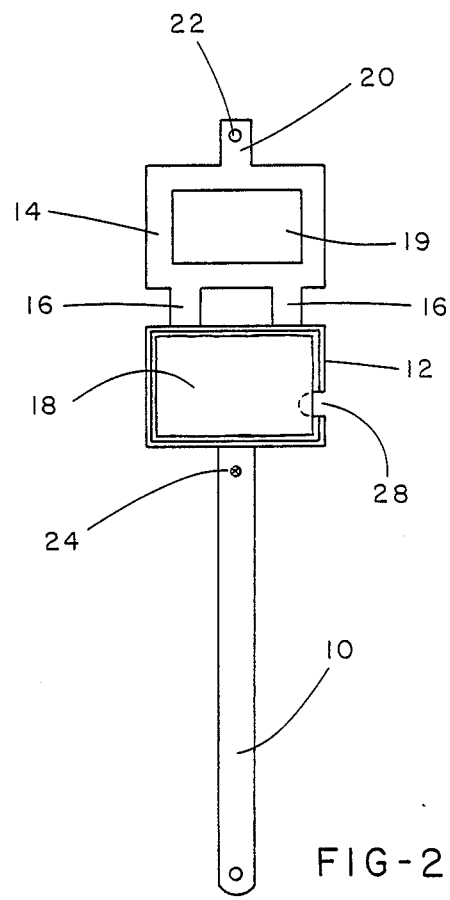
FIG. 2 is a front view of the embodiment of FIG. 1.

As indicated in FIG. 2, a semicircular cutout 28 may be placed at the edge of head 12 to facilitate the lifting out and replacement of adhesive sheet 18. Sheet 18 may be held in place by any of a variety of means including the use of an adhesive backing or edge retaining clips or the like.

A rim 30 separates the cover and head to prevent the surface of the cover and the insecticide 19 from coming into contact with the adhesive sheet. As mentioned above the embodiment shown is particularly suited to be manufactured as a single unit of molded plastic. In this arrangement, the rim may be attached to either head 12 or cover 14. In this method of manufacture, hinges 16 may simply comprise thinned strips of plastic.

Variations of the above disclosed apparatus will be obvious to those skilled in the art. For example, the cover may be hinged to the handle rather than the head and the cover might extend from the side of the head rather than the top. Accordingly, the invention is defined by the following claims.

What is claimed is:

1. A fly catcher comprising in combination:
   a. a head member;
   b. a handle attached to said head member;
   c. a sheet of adhesive material disposed on the surface of said head;
   d. a cover member arranged to substantially cover said head;
   e. hinge means positioned between said cover and said head for attaching said cover to said catcher; and
   f. a separating rim disposed about the periphery of and between said head and said cover members.

2. The apparatus of claim 1 further including catch means for holding said cover closed over said head member.

3. The apparatus of claim 1 further including catch means for holding said cover open from said head member.

4. The apparatus of claim 1 further including a quantity of insecticide disposed in said cover.

5. The apparatus of claim 1 wherein said rim is attached to said head member.

6. The apparatus of claim 1 wherein said hinge means is attached to said head member.

* * * * *